(12) United States Patent
Flesher et al.

(10) Patent No.: US 7,805,415 B1
(45) Date of Patent: Sep. 28, 2010

(54) SYSTEMS AND METHODS FOR SHARING DATA BETWEEN ENTITIES

(75) Inventors: Kevin E. Flesher, Broomfield, CO (US); Geoff Shaw, Scottsdale, AZ (US)

(73) Assignee: Lockheed Martin Corporation, Bethesda, MD (US)

( * ) Notice: Subject to any disclaimer, the term of this patent is extended or adjusted under 35 U.S.C. 154(b) by 964 days.

(21) Appl. No.: 11/131,940

(22) Filed: May 18, 2005

Related U.S. Application Data

(63) Continuation of application No. 10/949,886, filed on Sep. 23, 2004, now abandoned, which is a continuation-in-part of application No. 10/459,388, filed on Jun. 10, 2003, now Pat. No. 7,437,408, and a continuation-in-part of application No. 10/459,394, filed on Jun. 10, 2003, now abandoned.

(60) Provisional application No. 60/505,071, filed on Sep. 23, 2003.

(51) Int. Cl.
*G06F 7/00* (2006.01)
*G06F 17/00* (2006.01)

(52) U.S. Cl. .................. 707/694; 707/738; 707/783; 707/784

(58) Field of Classification Search .............. None
See application file for complete search history.

(56) References Cited

U.S. PATENT DOCUMENTS

| | | | |
|---|---|---|---|
| 4,882,752 | A | 11/1989 | Lindman et al. |
| 5,355,474 | A | 10/1994 | Thuraisngham et al. |
| 5,872,847 | A | 2/1999 | Boyle et al. |
| 5,960,080 | A | 9/1999 | Fahlman et al. |
| 5,999,192 | A * | 12/1999 | Selfridge et al. ............ 345/440 |
| 6,304,973 | B1 | 10/2001 | Williams |
| 6,430,602 | B1 * | 8/2002 | Kay et al. ................... 709/206 |
| 6,678,822 | B1 | 1/2004 | Morar et al. |
| 6,834,382 | B2 | 12/2004 | Marso et al. |
| 7,231,378 | B2 * | 6/2007 | Lawson et al. ................. 707/2 |
| 2002/0073058 | A1 | 6/2002 | Kremer et al. |
| 2002/0083210 | A1 | 6/2002 | Harrison et al. |
| 2002/0141449 | A1 | 10/2002 | Johnson |
| 2003/0200192 | A1 * | 10/2003 | Bell et al. ...................... 707/1 |

(Continued)

OTHER PUBLICATIONS

Myliymaki, J.; Effective Web Data Extraction with Standard XML Technologies; May 1, 2001; ACM; p. 689-696.

*Primary Examiner*—Jay A Morrison
(74) *Attorney, Agent, or Firm*—Marsh Fischmann & Breyfogle LLP

(57) ABSTRACT

The present invention is generally directed to methods and apparatus for sharing data. A system maintains the integrity of the data by controlling access to and from the data. For example, one entity may wish to cooperate with another entity by sharing information with the other entity. The sharing entity may, however, wish to block access to certain portions of the data. The system, therefore, includes a processor configured for processing stored rules that, when processed, control transfer of the data to the other entity. The processor maintains integrity of the data because, among other reasons, the processor can determine that certain portions of the data to be transferred should be excluded from an intended recipient based upon a processed rule. Examples of such data sanitization include the deletion of information regarding the data owner, the data provider and/or other entity specific sensitive portions of the data.

21 Claims, 12 Drawing Sheets

U.S. PATENT DOCUMENTS

2004/0088723 A1* 5/2004 Ma et al. .................. 725/19
2004/0153908 A1* 8/2004 Schiavone et al. .......... 714/712
2004/0186836 A1* 9/2004 Schlesinger .................. 707/9
2005/0065950 A1* 3/2005 Chaganti et al. ............ 707/100

* cited by examiner

SYSTEMS AND METHODS FOR SHARING DATA BETWEEN ENTITIES

CROSS REFERENCE TO RELATED APPLICATIONS

This application claims priority to U.S. Provisional Patent Application No. 60/505,071 (filed Sep. 23, 2003), which is incorporated herein by reference. This application is a continuation of and claims priority to U.S. patent application Ser. No. 10/949,886 which was filed on Sep. 23, 2004 now abandoned, which is a continuation in part of and claims priority to commonly owned U.S. patent application Ser. No. 10/459,388 (filed Jun. 10, 2003 now U.S. Pat. No. 7,437,408; the "'388 Application") and Ser. No. 10/459,394 (filed Jun. 10, 2003 now abandoned; the "'394 Application"), all of the disclosures of which are incorporated herein by reference.

FIELD OF THE INVENTION

The present invention relates in general to sharing data between entities, and in particular, to a system that assesses risk when data sharing policies are not complied with. The system provides a framework for establishing rules that implement the policies and measure the risk assessment. These policies govern the transfer of data from one entity to another and the rules enable the entities to independently quantify a data sharing risk prior to a data transfer.

BACKGROUND OF THE INVENTION

Today, electronic communication between entities is generally an important part of cooperating to achieve a mutually desired outcome. Such communication may involve real-time or near real-time messages between entities or storage of information by one entity for subsequent retrieval by or transmission to another entity. Through the advancement of technology, the amount and complexity of communicated information has increased dramatically. For example, faster processors and larger storage systems have enabled entities to communicate larger amounts of information in shorter periods of time than those entities were able in the past. While the ability to communicate these larger amounts of information has improved dramatically, control over the dissemination of information itself has become increasingly complex and difficult to manage.

An example of controlled sharing and dissemination of information is the shared database environment. This generally includes situations where multiple entities can access a database and where a private access database can be used to selectively transfer data to an external entity. Many organizations use shared databases to allow members of its organization to share information between the members. To illustrate, a bank may use a database to store banking records of its clientele. Employees of the bank often require access to the database in order to serve the needs of the bank's clientele. Additionally, the bank may require that certain operational units of the bank share information. For example, the bank may store information regarding "unfriendly accesses" to the bank's central computer system. These unfriendly accesses may include, among other things, computer attacks by an external computer hacker. A security entity of the bank may require its members to share information regarding such an unfriendly access and subsequently determine which information may be shared with the appropriate authorities, such as the police or the Federal Bureau of Investigation ("FBI").

Shared databases exist in a variety of forms. Often these databases are located within large storage systems that allow one or more entities to access information from the shared database in an organized fashion. For example, a database organizes a collection of information in such a way that a computer program can quickly select desired pieces of data. The database therefore operates as a sort of electronic filing system.

Traditional databases are organized by fields, records, and files, wherein a field is generally referred to as a single piece of information, a record is generally referred to as one complete set of fields and a file is generally referred to as a collection of records. For example, a telephone book is analogous to a file. It contains a list of records, each of which consists of three fields: name, address and telephone number. While a telephone book typically allows a person to search through fields by name to find a telephone number of interest, a database can allow a person to locate desired information within almost any field.

More recently, databases include the use of Hypertext. Hypertext is particularly useful for organizing and browsing through large databases that consist of disparate types of information. In a Hypertext database, substantially any object, such as text and image files, can be linked to almost any other object in the database. A selected object allows a user to view all other objects linked to the selected object regardless of data type. For example, a user may access a database to retrieve a text file that contains links to other files, such as image files, associated with that text file. These links may allow the user to retrieve a linked file, for example, by the simple click of a computer mouse at the user's computer terminal. Such links are commonly referred to as hypertext links.

For a user to access data in a database, the database is controlled by a database management system. The database management system is a collection of software programs that enables users to access, organize and/or select data. Examples of such software programs include the Microsoft SQL Server and the Oracle Enterprise Manager. Although typically transparent user, the database management system provides a "view" of the database to the user so that the user may retrieve information as needed.

These databases and database management systems, collectively referred to as database systems, can also be configured to allow a plurality of entities, each having a unique organizational goal, to share information. Additionally, a database system may be configured to allow, for example, one entity to access a particular "partition" of data within the database while excluding another entity from accessing that partition. As described in the bank security example, a bank's security organization may maintain a private record of the bank's computer attacks in one partition of the database system while allowing other entities possibly including external organizations access to another partition of the database system. Both partitions may reside within the same database system, but each ensures mutual exclusivity among the entities.

When one entity determines that another entity should be granted access to certain information, the granting entity may access the information and manually "parse out" either unnecessary or sensitive information for the other entity. For example, an airline organization may keep detailed records of a passenger manifest within the organization's database system. Police and/or counter terrorist organizations may be interested in information regarding a particular passenger who frequently travels with that airline. The airline organization may, in the interests of national security as well as the safety of its passengers, wish to cooperate with such public safety organizations and provide information regarding that particular passenger to those organizations. The airline organization, as well as many other organizations, may however wish to protect or withhold other "company sensitive" information. Accordingly, the airline organization will remove the company sensitive information and communicate that passenger information to the desiring public safety organization.

With sensitive information removed, one entity may cooperate with another entity by providing "sanitized" information to the other entity confident in the fact that the sensitive information has been protected. However, the process to remove the sensitive information is a cumbersome and time-consuming one that involves human interaction. Additionally, as humans are prone to make mistakes, sensitive information may on occasion be inadvertently transferred to another entity. Such inadvertent transfers may expose an entity to unfortunate circumstances, such as legal liability and/or competitive vulnerability. For example, if a bank unintentionally publishes information regarding a number of times the bank has been a victim of computer fraud, other competing banks may prey upon the bank's weaknesses through negative marketing.

The information sharing problems as noted herein are not limited to either exclusively commercial entities or exclusively public entities. Public entities, such as law enforcement, often desire to interact with commercial entities so that they may better serve the public in general. However, commercial entities are often reluctant to cooperate with public entities for fear that sensitive company information may be exposed to the public domain. As a result, operations of the public entities are often obstructed to the detriment of the public in general.

SUMMARY OF THE INVENTION

The present invention is generally directed to methods and apparatus for sharing data. In one embodiment of the invention, a system maintains the integrity of the data by controlling access to or dissemination of the data. For example, one entity may wish to cooperate with another entity by sharing information with the other entity. The sharing entity may, however, wish to block access to certain portions of the data. The system, therefore, includes a processor configured for processing stored rules that, when processed, control transfer of the data to the other entity. The processor maintains the integrity of the data because, among other reasons, the processor can determine that certain portions of the data to be transferred should be excluded from an intended recipient or an intended use based upon a processed rule. Examples of such data sanitization include the deletion of information regarding the data owner, the data provider and/or entity sensitive portions of the data itself.

It has been recognized that successful implementation of such a system depends on development of rules that accommodate the potentially different interests of the concerned entities and the development of verifiable safeguards, regarding dissemination of data, that are sufficient to engender the trust that promotes such sharing. In particular, it has been recognized that a platform having the potential to become the trusted standard for a variety of applications and environments would desirably accommodate the concerns of various types of entities in relation to a variety of different data sharing contexts and environments. By recognizing and, for example, parameterizing this potential range of interests and concerns, appropriate fields can be built into the platform or the platform can be constructed to accommodate such fields as may arise. In this manner, such fields can be readily populated as rules are developed for a new application, thereby accelerating implementation and leveraging the trust earned through successful deployment in other fields. Moreover, a platform implemented over disparate applications may yield synergies relating to identification and monitoring of events or trends of interest.

For certain applications, standards for information dissemination are well defined and are readily reduced to rules involving one or a small number of fields. For example, in national intelligence related applications, well-defined standards exist for information dissemination largely based on the identity or association of the intended recipient. However, outside of such narrowly defined environments, rule development becomes more complex. For example, a company may be willing to share certain information with a government entity but not with competitors. Or it may be willing to disclose such information to the government entity for a particular purpose, provided that the information is not used in any other way. Thus, it has been recognized that the rules may have to account for, among other things, what is the source of the data, who owns the data, what kind of data is it, who is the potential recipient, and what is the potential recipient going to do with the data. Single or multiple parameter tests may be required in this regard. While this appears daunting, the present invention provides a framework for efficiently accommodating these considerations so that willing participants can realize the substantial, even critical, potential benefits of information sharing.

In one embodiment of the invention, the system includes a storage element that stores the rules. The rules may utilize information regarding one or more of the following "operational identifiers": a policy framework, a data type, a data transfer and/or a data classification. The policy framework as used herein may include information about a data owner, a data provider, the data itself, a data user and/or an intended use of the data. This information may also include policy rules defined by the data owner and/or data provider. Additionally, this information may include policy rules specific to the data itself and/or to the application and intended data use. These operational identifiers may therefore provide a framework for implementing policy that is formulated by the entities involved in information sharing.

The data type relates to the type of data, such as entity information and transactional information. For example, entity information may be that which identifies data associated with an entity such as name, address, accounts, affiliations, and relationships of an entity. The entity may be an individual, a company, or government organization. Transactional information between entities may include purchase information, shipment information, travel information, attendance information and contact information. Examples include an individual's credentials, banking information, a credit transaction, passenger manifests, shipping records, Immigration and Naturalization Service—"INS"—records, government Visa information, etc.). A data transfer operational identifier indicates information relevant to the data being transferred. For example, the data transfer identifier may include routing tags, message tags, time tags and/or message fields. Such information may be particularly beneficial for auditing purposes, as explained below.

The data classification describes the sensitivity of information transferred. For example, government intelligence entities of the United States have designated classification systems and handling caveats that are used to indicate the sensitivity of information. Private entities and other governmental entities may also have classification standards to similarly indicate the sensitivity of information for their respective organizations.

According to one aspect of the invention, the system comprises a data system that processes (e.g., stores, disseminates, allows access to, or aggregates, modifies or otherwise sanitizes) data with respect to a plurality of defined fields. For example, a particular entity may transfer information to the system. The information may be segmented into data segments according to certain aspects of the information, such as data type. The data segments may also be cross-referenced and stored according to data classification (e.g., a public record, a private record, a public/private record, a government security classification, a law enforcement classification, etc.). A rule that governs the transfer between entities can be provided for each independent transfer that determines what data should be transferred. The processor may therefore identify a data segment(s) within the system and transfer the data to an entity according to the generated rule.

As an illustration, a shipping agency (e.g., Federal Express) may wish to cooperate with a particular governmental agency (e.g., law enforcement) by conveying data pertaining to certain operational aspects of the shipping agency. The shipping agency may wish, however, to conceal certain other operational aspects of the shipping agency. For example, the governmental agency may request information regarding a particular type of shipment made by a person of interest. The shipping agency may provide this information to the governmental agency while simultaneously "masking" the shipping agency's identification, other customer shipments and/or pricing strategies. The shipping agency may deem such information as particularly sensitive and may therefore wish to conceal the information from the governmental agency for fear of exposure of the information to the public domain.

According to another aspect of the invention, data transfers between entities may be performed in a substantially "real-time" environment. For example, information from one entity may be passed to the shared information system, which processes the information and segments it into data segments according to one or more operational identifiers. The shared information system then processes a rule that controls the amount of data to be transferred to another entity. Such an embodiment may be implemented using real-time devices, such as flash memory for temporary storage of data with a computer processor communicatively coupled thereto. Accordingly, the shared information system may be part of a communication link that allows for "in line" processing of data being transferred between entities.

According to another aspect of the invention, the system may comprise communication portals, each of which is configured for transferring data between an entity and the system. For example, a first communication portal may allow a first entity to access the database system and transfer data between the first entity and the database system. Once data is deposited by the first entity within the database system, a second entity may access certain deposited data through a second communication portal as determined by the processor. The processor may control the transfer of data selected by the second entity according to one or more predetermined operational identifiers such as those described hereinabove.

According to yet another aspect of the invention, the shared information system may comprise an automated compliance auditor for performing a review of transferred information to ensure system compliance. For example, one entity may transfer information to system in the spirit of collaboration with another entity. The transferring entity, wishing to preclude certain information from the other entity, may desire confirmation that its protected information is not transferred to the other entity. The compliance auditor can identify transferred data by the data transfer identifier since the identifier may include information such as routing tags, message tags, time tags and/or message fields. With the data transfer identifier of a particular data transfer obtained, the compliance auditor can provide confirmation to the transferring entity that the requesting entity was granted access to or actually received only the information specified by the transferring entity.

BRIEF DESCRIPTION OF THE DRAWINGS

For a more complete understanding of the present invention and further advantages thereof, reference is now made to the following detailed description taken in conjunction with the drawings in which.

DETAILED DESCRIPTION

The present invention is generally directed to a shared information system. The invention is applicable in a variety of contexts where it is desirable to share information between entities while systematically denying certain entities access to at least portions of the information. Moreover the invention may be implemented in conjunction with a variety of different applications. In the following description, the invention is set forth in the context of a shared information system. This context serves to illustrate the various function and advantages of the present invention, but it should be appreciated that the invention is not limited to this context.

Figure 1:
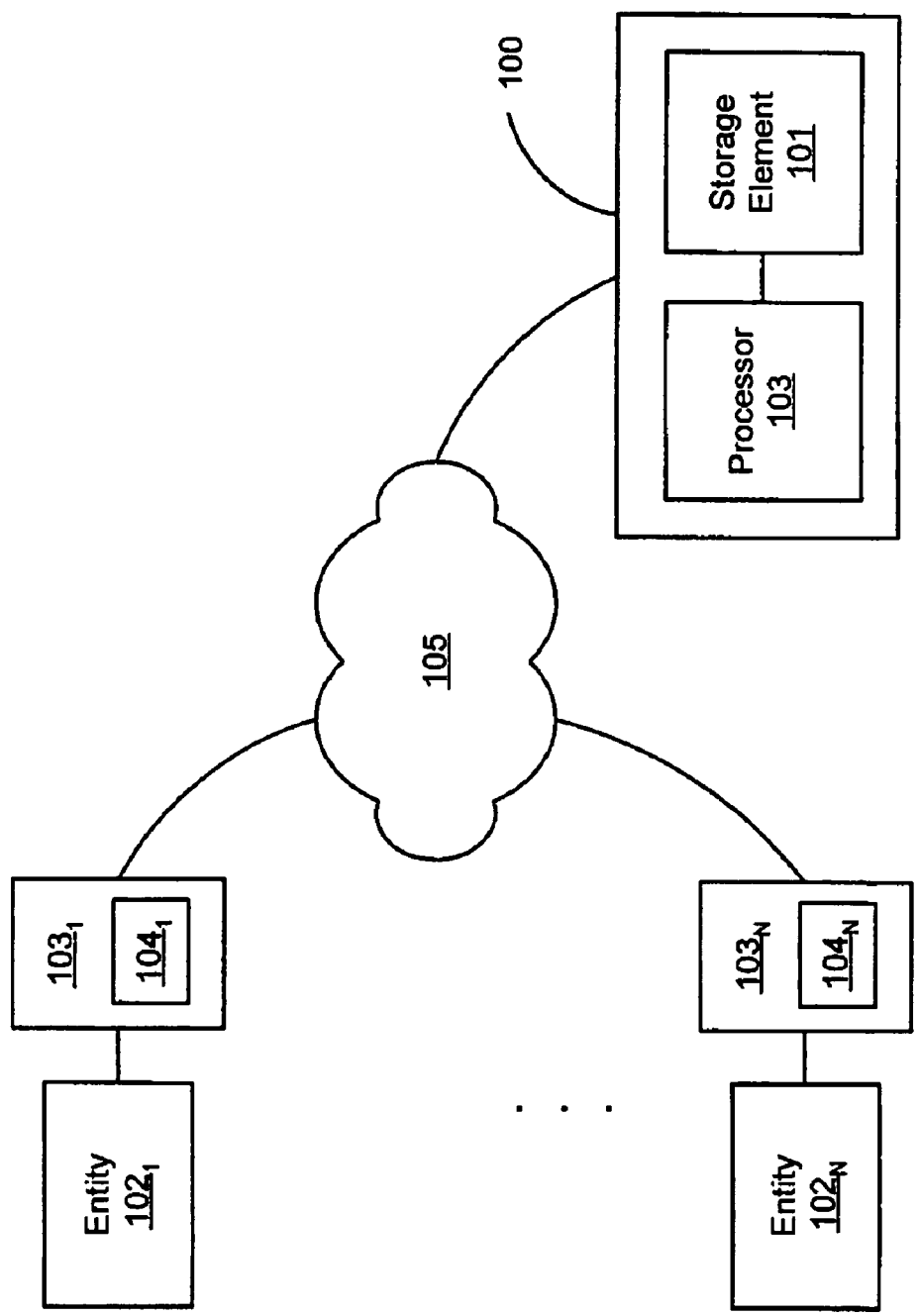
FIG. 1 is a block diagram of a shared information system in accordance with one exemplary embodiment of the present invention.

Turning now to FIG. 1, the figure is a block diagram of shared information system 100 in accordance with one exemplary embodiment of the present invention. System 100 is configured for sharing information between a plurality of entities $102_{1 \ldots N}$. System 100 may be configured as a database system that allows each entity to access data within the system and/or as a "real-time" shared information system that allows substantially simultaneous transfers of data between entities. Another feature of system 100 allows entities to share information while simultaneously protecting certain entity specific information. For example, entity $102_1$ may wish to share information in a collaborative environment with entity $102_N$. Entity $102_1$ may, however, wish to preclude entity $102_N$ from gaining access to certain information deemed sensitive by entity $102_1$. System 100 can therefore conceal from entity $102_N$ the sensitive information of entity $102_1$. Such a process may instill confidence in entity 102 such that the entity is encouraged to share information without fear of compromise of sensitive information.

System 100 may be configured to share information between a plurality of entity types. For example, system 100 can be adapted to operate within a public/private communication space that allows public entities (e.g., such as government agencies and law enforcement agencies) and private entities (e.g., such as banks, shipping organizations, transportation organizations, engineering firms, et cetera) to share certain information while simultaneously protecting sensitive information from selected entities associated with the system. Those skilled in the art should readily recognize that system 100 may be similarly adapted to operate within either a purely private communication space or a purely public communication space. Accordingly, the invention is not intended to be limited to any particular entity type.

In one embodiment of the invention, system 100 comprises a storage element that is configured for storing rules. The rules, when processed, control the transfer of data between entities $102_{1...N}$ and maintain integrity of the data within system 100. As such, system 100 also comprises processor 103 for processing the rules. For example, the rules may include information regarding one or more operational identifiers, such as a policy framework, a data type, a data classification and a data transfer. When processor 103 processes a particular rule, processor 103 may determine if an entity should be granted access to data transferred by another entity.

Entities $102_{1...N}$ may access system 100 through communication portals $103_{1...N}$. For example, shared information system 100 may comprise communication portals $103_{1...N}$ communicatively coupled thereto (i.e., via communicative coupling 105) such that an entity may transfer data to and from the shared information system 100. A communication portal 103 may comprise an interface 104 that allows an entity to access system 100 through an entity verification process. In such a process, an entity 102 may be required to input information regarding, among other things, the entity's identification (e.g., a "user ID") and password. Upon successful verification of the entity's "login", processor 103 may grant access to the entity 102 such that the entity may share information with one or more of the other entities $102_{1...N}$ associated with system 100.

Upon being granted access to system 100, an entity 102 may receive information from another entity. In an exemplary real-time transfer, entity $102_1$ may transfer information to entity $102_N$ via system 100 in such a way that certain information is concealed from entity $102_N$. Once entity $102_1$ transfers information to system 100, processor 103 may select from storage element 101 a particular rule associated with each of the transferring and receiving entities. Based upon the selected rule, processor 103 may "sanitize" certain information transferred from entity $102_1$. Such sanitized information may include, among other things, entity $102_1$'s identity. System 100 may then transfer the sanitized information to entity $102_N$. Rule selection and formatting is described in greater detail below herein. Sanitization, in an exemplary embodiment, may be performed by the systems and according to the processes described in the '801 Application.

In another exemplary embodiment, entity $102_1$ may deposit or store information with storage element 101 for subsequent use by entity $102_N$. For example, entity 1021 may transfer information to system 100 for organized storage within storage element 101. Processor 103 may scan the information and segment it into data elements according to one or more particular operational identifiers, such as policy framework, data type, data classification and data transfer. The segmented data may thus be stored and organized within storage element 101 by fields, records, and files with respect to the operational identifiers. As such, storage element 101 may be considered in one aspect of the invention as a database system.

Communicative coupling 105, as shown herein, may be implemented through any of a variety of well-known communication links. Examples of such communication links include Ethernet connections; a Public Switching Telephone Network ("PSTN"); a Local Area Network ("LAN"); a wireless network; and a Wide Area Network ("WAN"). Additionally, communications between an entity 102 and system 100 may be formatted using any of a variety of well-known communication protocols. Examples as such communication protocols include Transmission Control Protocol/Internet Protocol ("TCP/IP") and File Transfer Protocol ("FTP"). Those skilled in the art, however, should readily recognize that invention is not intended to be limited to the types of communication links or the types of communication protocols used. Other communication links/protocols that may be suitable for use with system 100 are known to those skilled in the art. For example, a variety of communication links/protocols that may be acceptable for use with system 100 can be found through the following communication standards organizations: American National Standards Institute ("ANSI"); International Telecommunication Union ("ITU"); Institute of Electrical and Electronic Engineers ("IEEE"); International Standards Organization ("ISO"); and Video Electronics Standards Association ("VESA").

System 100 in general may be configured in a variety of manners involving hardware, software, firmware and various combinations thereof. For example, system 100 may be configured as a computer-based server with software applications that enable entities to transfer information according to the principles described herein. Those skilled in the art are readily familiar with hardware, software, and firmware, as well as their various combinations. The invention, therefore, is not intended to be limited to any particular implementation as such implementations are often a matter of system design choice.

Figure 2:
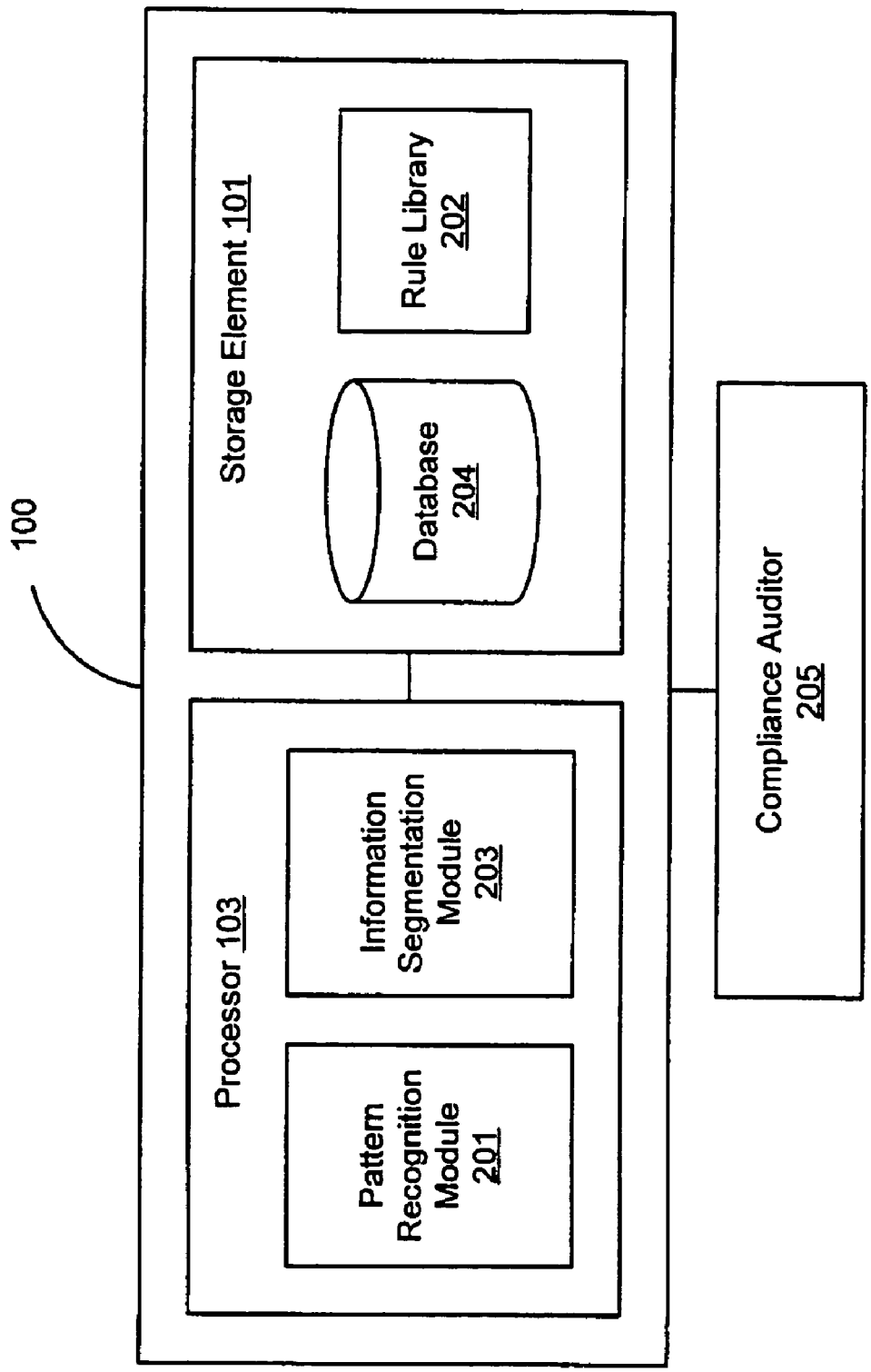
FIG. 2 is another block diagram of a shared information system in accordance with one exemplary embodiment of the present invention.

FIG. 2 is another block diagram of shared information system 100 in accordance with one exemplary embodiment of the present invention. Processor 103 is shown and described in this exemplary embodiment as comprising components that assist in the segmentation as well as augmentation of data transferred to system 100. Specifically, processor 103 includes information segmentation module 203 and pattern recognition module 201. Information segmentation module 203 scans information transferred by an entity and segments the information into data portions according to the operational identifiers described hereinabove. For example, once the information is transferred, information segmentation module 203 may identify portions of the information to be associated with a policy framework, a data type, a data classification, and/or a data transfer. Information segmentation module 203 may further identify each segmented portion of the information with identifiers that are sub components of the operational identifiers segments. Further segmentation of the "operationally identified" segments is explained in greater detail in FIGS. 4-7.

The policy framework as described hereinabove may include information about a data owner, a data provider, the data itself, a data user and/or a use of the data. Accordingly, information that is transferred by an entity may be segmented into data segments and tagged with sub components identifiers with respect to the information of the policy framework (i.e., data owner, data provider, etc.). Information segmentation module 203 similarly further segments the information into data segments according to the data type (e.g., an individual's credentials, banking information, a credit transaction, passenger manifests, shipping records, Immigration and Naturalization Service—"INS"—records, et cetera). Further data segmenting may be similarly performed according to the data transfer identifier and/or the data classification.

Information segmentation module 203 may segment the information with respect to a data classification to determine access to certain information. For example, information transferred to system 100 may include one or more classifications based on the sensitivity of the information. Information segmentation module 203 segments the information into data segments according to the classifications such that a requesting entity does not obtain information for which it does not have clearance. Once segmented, processor 103 may review the data classification segmented information and authorize a requesting entity access if it meets or exceeds the classification level of the segmented data.

Information segmentation module 203 can also segment transferred information according to the transfer identifier previously stated. For example, system 100 may store a copy of data transferred from one entity to another entity. Information segmentation module 203 may segment the transferred data according to routing tags, message tags, time tags and/or message fields. As such, a compliance auditor 205 (described below) may obtain the transfer identifier to ensure rule compliance for data transfers within system 100.

Segmented data can be stored within database 204 of storage element 101. Accordingly, storage element 101 and database 204 may form a database system as described hereinabove that stores the segmented data in fields, records, and files. Database system organization exists in many forms and is well-known to those skilled in the art. The segmented and organized data may be transferred to a requesting entity as determined by processor 103. For example, processor 103 may access rule library 202 when a requesting entity desires access data within database 204. Processor 103 may subsequently select and apply one or more rules from rule library 202 to ensure that the requesting entity does not obtain data for which is not authorized.

In one embodiment of the invention, processor 103 selects the rule(s) from rule library 202 based on "entity matching" of the requesting and transferring entities. To illustrate, the rule selection may be performed as a matrix operation. Each entity may be associated with one or more operational identifiers, wherein each operational identifier is associated with a subspace of the matrix. A rule to control the transfer data between entities may therefore be selected when the entities correspond to a predetermined "rule vector" lying in the subspaces of the matrix. The selected rule is then processed by processor 103, which subsequently determines which data a requesting entity is to receive. Matrix processing is well-known to those skilled in the art.

Another feature of processor 103 is the pattern recognition module 201. Pattern recognition module 201 is configured for aggregating data maintained by database 204. For example, as database 204 may store segmented data in an organized fashion, pattern recognition module 201 may scan the stored data and detect certain statistical properties within at least portions of the data. Detected patterns or anomalies in the data may be subsequently stored with database 204 for use by the requesting entities.

As previously mentioned, system 100 may comprise compliance auditor 205 for performing a review of transferred data ensure system compliance. For example, one entity may transfer information to system 100 in the spirit of collaboration with another entity. The transferring entity, wishing to preclude certain information from the other entity, may desire confirmation that its sensitive information is not transferred to the other entity. The compliance auditor 205 can identify transferred data with respect to the data transfer identifier because this identifier may include information such as routing tags, message tags, time tags and/or message fields. With the data transfer identifier of a particular data transfer obtained, the compliance auditor 205 can provide confirmation to the transferring entity that the requesting entity was granted access to or actually received only the information specified by the transferring entity.

Although storage element 101 is described with particular relevance to a database system, the invention is not intended to be limited to any type of "store and forward" system as is well-known to those skilled in the art. For example, the invention is not intended to preclude substantially real-time data transfers. Rather, certain implementations of system 100, and more particularly storage element 101, may in fact more easily facilitate real-time transfer of data. For example, storage element 101 may be a flash memory capable of maintaining a firmware filing system. Database 204 may therefore be representative of such a firmware filing system.

In such a real-time embodiment, processor 103 may transfer data between entities using the firmware filing system. For example, one entity may transfer data to processor 103, which in turn temporarily maintains the data within the firmware filing system. Processor 103 may then apply one or more rules to determine the authorization to at least a portion of the data by another entity. The delays associated with such data maintenance and processing are often so negligible that a system so operating is deemed as a "real-time" system. Examples of such real time systems are often found in the embedded processing systems industry. Those skilled in the art are familiar with real-time and embedded processing systems.

Figure 3:
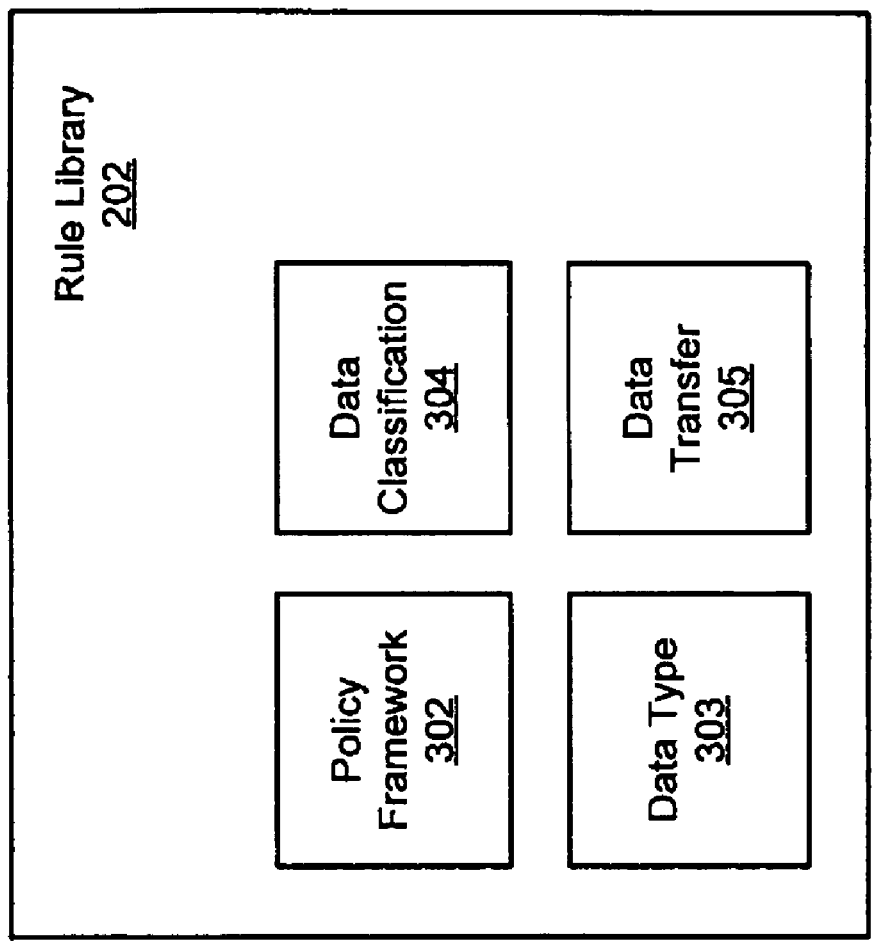
FIG. 3 is a block diagram of a rule library configurable with a storage element in accordance with one exemplary embodiment of the present invention.

FIG. 3 is a block diagram of a rule library 202 configurable with a storage element, such as storage element 101 of FIG. 2, in accordance with one exemplary embodiment of the present invention. In this embodiment, rule library 202 is configured for storing a plurality rules used to control the transfer data between entities. The rules are generated and organized according to one or more operational identifiers comprising policy framework 302, data type 303, data classification 304 and data transfer 305.

Since the data is already segmented and organized according to the operational identifiers, the rules can be generated as logic commands suitable for processing by a computer processor. For example, data that is segmented according to a policy framework may have information pertaining to a data owner, a data provider, a data user and a use for the data. Additionally, the data may be segmented according to a data classification using a government or industry classification standard as described hereinabove. A rule can be generated that takes one or more of these operational identifiers into consideration. Accordingly, when one entity desires to transfer information to another entity, a processor may process the rule and control the transfer data based on those operational identifiers.

Each rule may be configured and selected according to a particular transfer of data between entities. For example, the transfer of data between two entities may be based at least in part on a negotiated security classification level and a desired a use for the data. In this example, a rule can be configured such that when the rule is processed it ensures that there is no compromised access to data and that the data is not improperly used. The rule of this example, therefore, ensures control of the transfer of data according to two operational identifiers.

The rules are not limited to a particular number of operational identifiers. The rules may incorporate one or more of these operational identifiers to control the transfer of data between entities based on those operational identifiers. For example, policy framework 302 may comprise information regarding, among other things, a data owner, a data provider, the data itself, a data user and/or a use of the data. With these inputs to rule generation, a rule can be generated that incorporates one or more of these subcomponent operational identifiers for policy framework 302.

Similarly, rules can be generated for data type 303, data classification 304 and/or data transfer 305. Data type 303 may incorporate information regarding an individual's credentials, banking information, a credit transaction, passenger manifests, shipping records, and/or INS records. Data classification 304 may incorporate information regarding private record documentation standards, public record documentation standards, law-enforcement security classification standards and/or government security classification standards. Data transfer 305 may incorporate information regarding time tags, routing tags, message tanks and/or message fields.

As with policy framework 302, rules can be generated based on one or more of these operational identifier subcomponents. Rule generation however is not limited to operational identifiers subcomponents of a particular operational identifier. Rather, in a preferred embodiment, a rule may be generated that incorporates each of these operational data identifiers and one or more of each operational identifiers' subcomponents. Inputs to these operational identifiers are now described in greater detail in FIGS. 4-7.

FIGS. 4-7 are block diagrams of operational identifier subcomponent inputs in accordance with exemplary embodiments of the present invention. In these embodiments, the operational identifiers policy framework 302, data type 303, data classification 304 and data transfer 305 are shown and described with their associated operational identifier subcomponents. These inputs to the operational identifiers may be used in the segmentation processes described hereinabove as well as for rule generation. For example, information segmentation module 203 of FIG. 2 may segment information with respect to one or more operational identifiers. Additionally, the information segmentation module may further segment the information according to one or more of the operational identifier subcomponents. Rules that, when processed, can be generated to incorporate these operational identifiers and their respective subcomponent information to control the transfer of data between entities.

Figure 4:
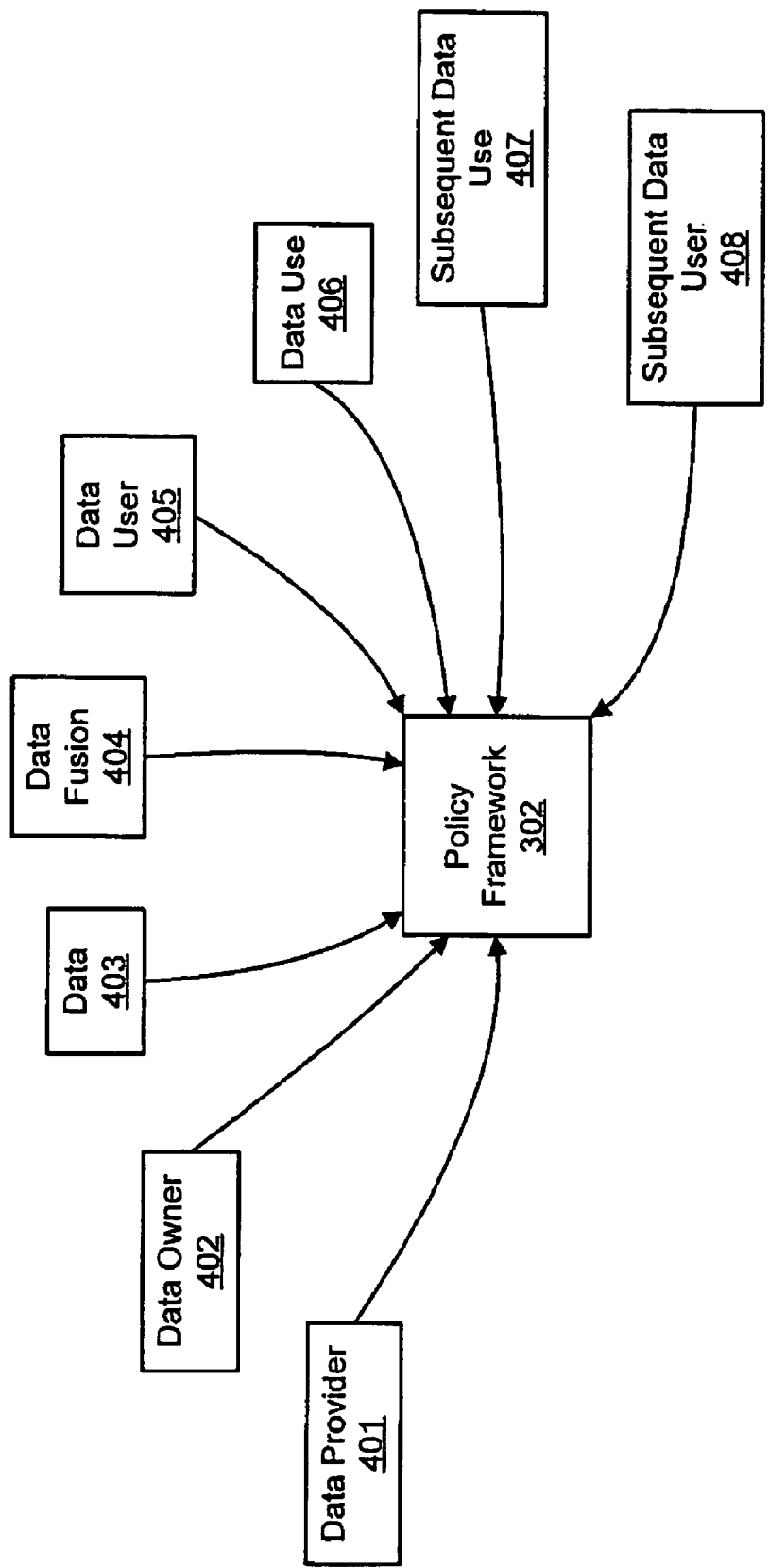
FIGS. 4-7 are block diagrams of operational identifier subcomponent inputs in accordance with exemplary embodiments of the present invention.

FIG. 4 illustrates the inputs to policy framework 302, which include data provider 401, data owner 402, data 403, fusion 404, data users 405, data use 406, subsequent data use 407 and/or subsequent data user 408. In one embodiment of the invention, policy framework 302 may include information pertaining to policy rules as defined by a data owner, data provider 401 and/or the data 403 itself.

Data provider input 401 may include information regarding an entity transferring the data to a shared information system, such as share information system 100 of FIG. 1. The data provider information may, however, differ from a data owner input 402. For example, an entity that originates data may be considered as a data owner, which may subsequently transfer data to the shared information system through a data provider.

Other inputs include the data 403 being transferred and data fusion 404. These inputs may include information pertaining to the format of the data. For example, data 403 may include data that is in the form of a text document. Data fusion 404 may be the aggregation of multiple pieces of data within the shared information system.

Inputs that include information pertaining to the users and the use of the data are illustrated as inputs data user 405, data use 406, subsequent data use 407 and subsequent data user 408. The information of these inputs regards the data receiving entity's identification and the entity's intended use for the data. In some instances the data may be transferred to subsequent users and may therefore have other uses. Accordingly, this information may be taken into consideration when segmenting information within the shared information system. Additionally, this information may be used to develop rules which control transfer of the data to the users and subsequent users with respect to their intended uses of the data.

Figure 5:
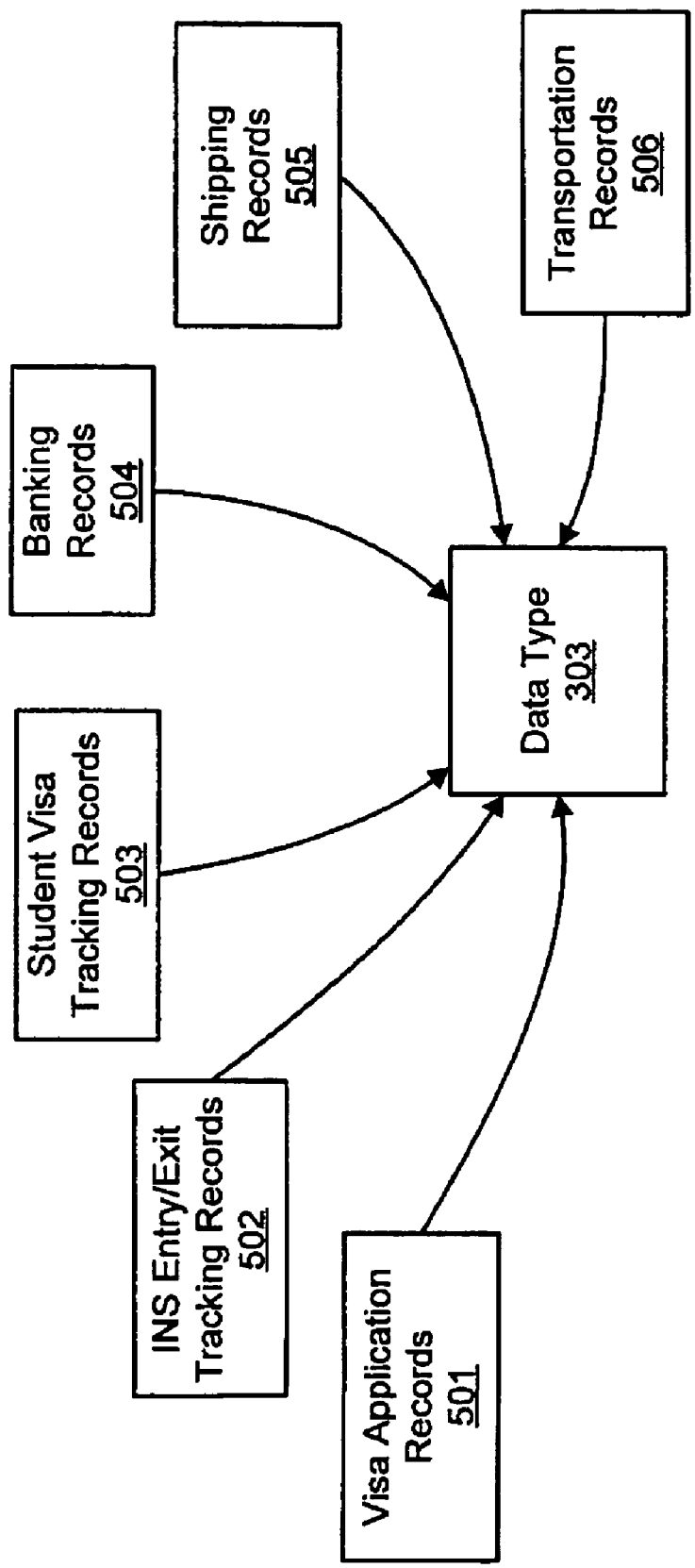

FIG. 5 illustrates inputs to the data type 303, which include Visa application records 501, INS entry/exit tracking records 502, student Visa tracking records 503, financial records 504, shipping records 505 and transportation records 506. These inputs include information indicative of a particular organization. For example, the government may maintain Visa application records 501, INS entry/exit tracking records 502 and student Visa tracking records 503 in order to control the number of foreigners entering/exiting the country and/or to ascertain the whereabouts of those people.

Banking records 504 may include information regarding certain financial transactions and/or credit applications for people of interest. Additionally, these banking records 504 may include information pertaining to certain operational aspects of a bank, such as the number of times the bank has experienced a computer attack. Shipping records 505 may include information pertaining to the types and/or number of shipments a particular person performs through a shipping carrier. Transportation records 506 may include information pertaining to passenger manifests, such as the number of times in a particular person travels with a particular airline. As with banking records 504, shipping records 505 and transportation records 506 may also include information pertaining to certain operational aspects of their respective industries.

Figure 6:
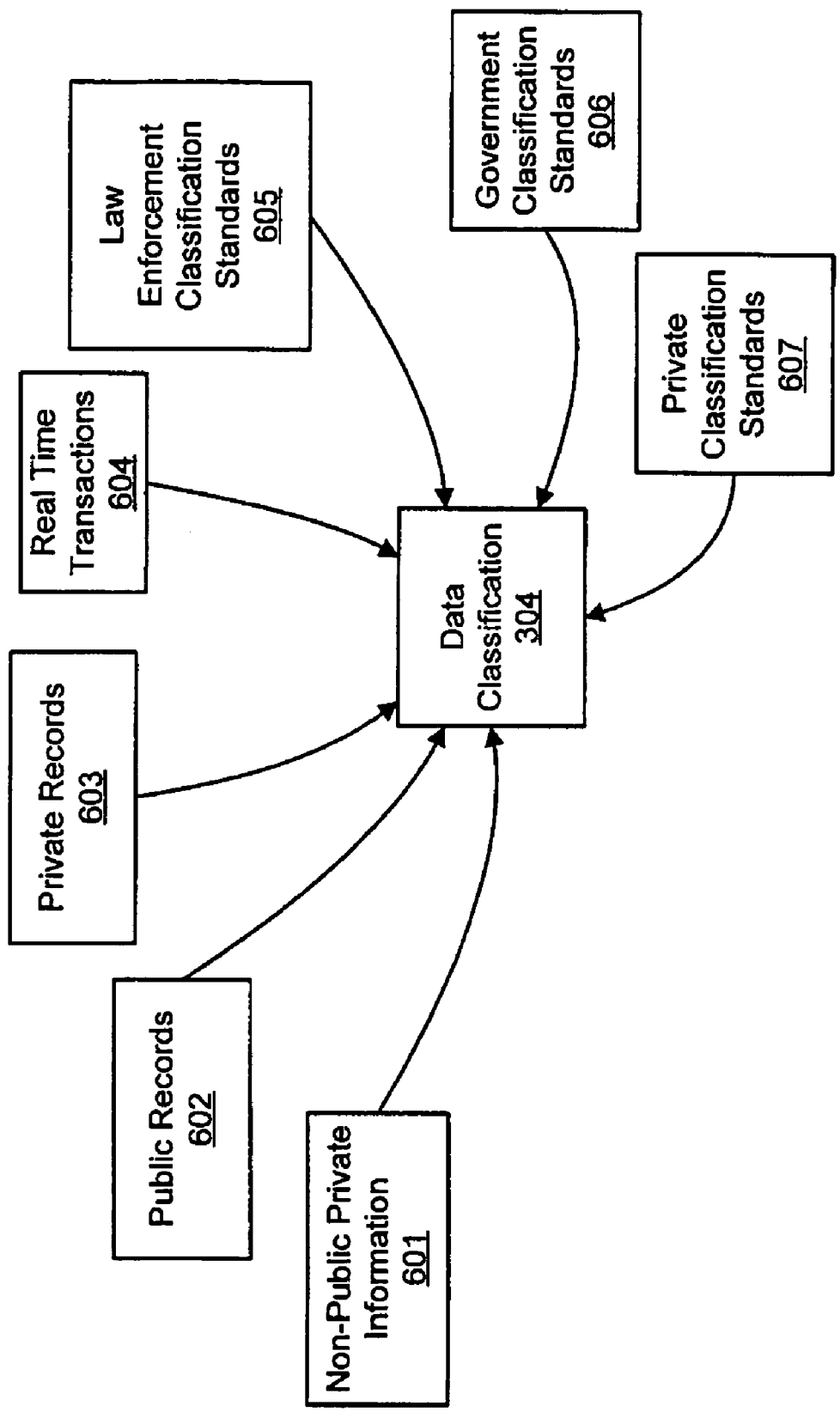

FIG. 6 illustrates inputs to the data classification 304, which include nonpublic private information 601, public records 602, private records 603, real-time transactions 604, law-enforcement classification standards 605, government classification standards 606 and private classification standards 607. Certain organizations may have unique classification standards some of which may designate the sensitivity of a particular piece of data. For example, government intelligence entities of the United States have the designated classification systems and handling which may also include subclassifications, that are used to indicate the sensitivity of information.

Similarly, private entities and other governmental entities may have classification standards to indicate the sensitivity of information for their respective organizations. For example, certain law-enforcement agencies may have law-enforcement classification standards 605 that are used to designate the sensitivity of information pertaining to their operations. Private organizations (e.g., banks, government contractors, transportation organizations and shipping organizations, et cetera) may employ their own versions of classification standards 607 also designate the sensitivity of information pertaining to their respective organizations.

Other inputs include non sensitive or "unclassified" information. Examples of these include non-public private information 601, public records 602 and private records 603. Information in the public domain that can be freely obtained (i.e., public records 602) and that which is freely given (i.e. non-public private information 601 and private records 603) may be transferred between entities without substantial risk of compromising companies sensitive information. Accordingly, this information may be tagged to be simply identified as a source of information.

Additionally, these inputs 601, 602 and 603 may be useful for aggregation and/or rule generation purposes. Because data can be segmented according to these non-public private information 601, public records 602 and private records 603, certain statistical properties, may be derived from the segmented data. For example, the number of people living in a region may be ascertained from public records 602. Such data may then be correlated Visa application records to determine percentages of foreigners with Visas living in that region.

Real-time transactions 604 may include information pertaining to a level of sensitivity of information that may be transferred in substantially real-time. For example, some security classifications may preclude the transfer of data in real-time. Accordingly, real-time transactions 604 may include information that is used to negotiate particular security classification levels that allow data transfer between entities.

Figure 7:
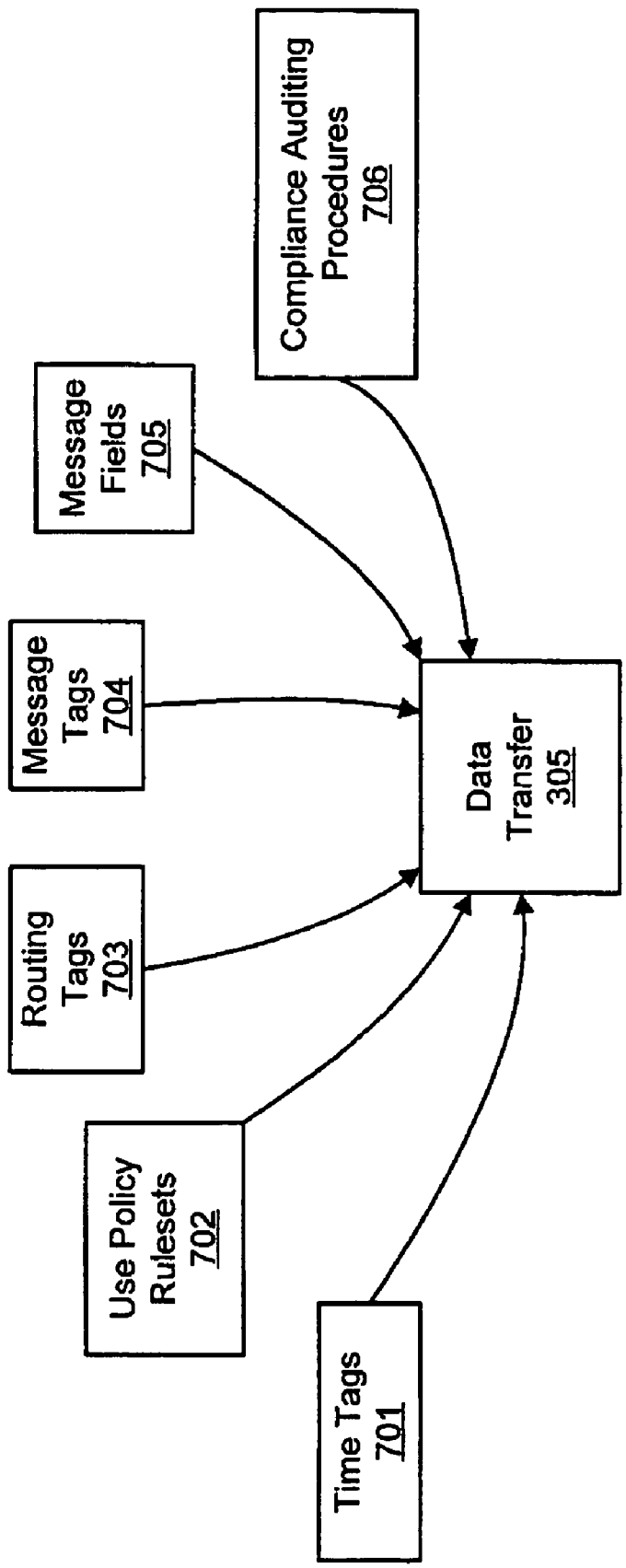

FIG. 7 illustrates inputs to the data transfer 305, which include time tags 701, use policy rule sets 702, routing tags 703, message tags 704, message fields 705 and compliance auditing procedures 706. These inputs each include information relevant to be transferred data within a shared information system, such as shared information system 100 of FIG. 1. For example, time tags 701, routing tags 703, message tags 704 and message fields 705 may all the relevant to a particular piece of data that was transferred from one entity to another. A time tag may indicate the actual time the data was transferred. The routing tagged may indicate the electronic address of the receiving entity. The message tag may indicate the type of message being transferred (e.g., data, text, voice, etc.). Message fields may contain information being transferred.

Each of elements 701, 703, 704 and 705 may be relevant to the compliance auditing procedures 706. For example, as a message is transferred from one entity to another, the message is tagged with the time, routing and message information being transferred. This information is retained within the shared information system for use by a compliance auditor, such as compliance auditor 205 of FIG. 2. Compliance auditing procedures 706 may therefore operate as an input to data transfer 305 as a preconfigured rule set that determines when such time, routing and message information are to be audited. Such auditing procedures may encourage entities to transfer data to the system as auditing data transfers may detect unauthorized data transfers, which may thereby expeditiously to prevent similar data transfers.

Use policy rule sets 702 may include information pertaining to controllable use of transferred data. For example, data use elements 406 and 407 of FIG. 4 include information regarding the intended use of data by a recipient. Use policy rule sets 702 may contain information that dictates how transferred data may be used. As such, policy rule sets 702 may be used to generate rules that may preclude the transfer of certain data when an entity intends to use the data in an unauthorized fashion.

FIGS. 4-7 as shown and described herein exemplarily illustrate diagrams of operational identifiers and their respective subcomponent inputs. Those skilled in the art should readily recognize, however, that other operational identifiers may be used. Additionally, the operational identifiers shown and described may have more or fewer subcomponent inputs than those illustrated. For example, the operational identifier data type 303 may include information pertaining to engineering firms and/or government contractors. Additionally, data type 303 may include other entity related information (e.g., names, addresses, accounts, affiliations and/or relationships) and transactional information (e.g., purchase information, shipment information, travel information, attendance information, attendance information and/or contact information).

Accordingly, the invention is not intended to be limited to the operational identifiers and their respective subcomponents inputs shown and described herein. Rather, the invention is only intended to be limited by the language recited in the claims and their equivalents.

Figure 8:
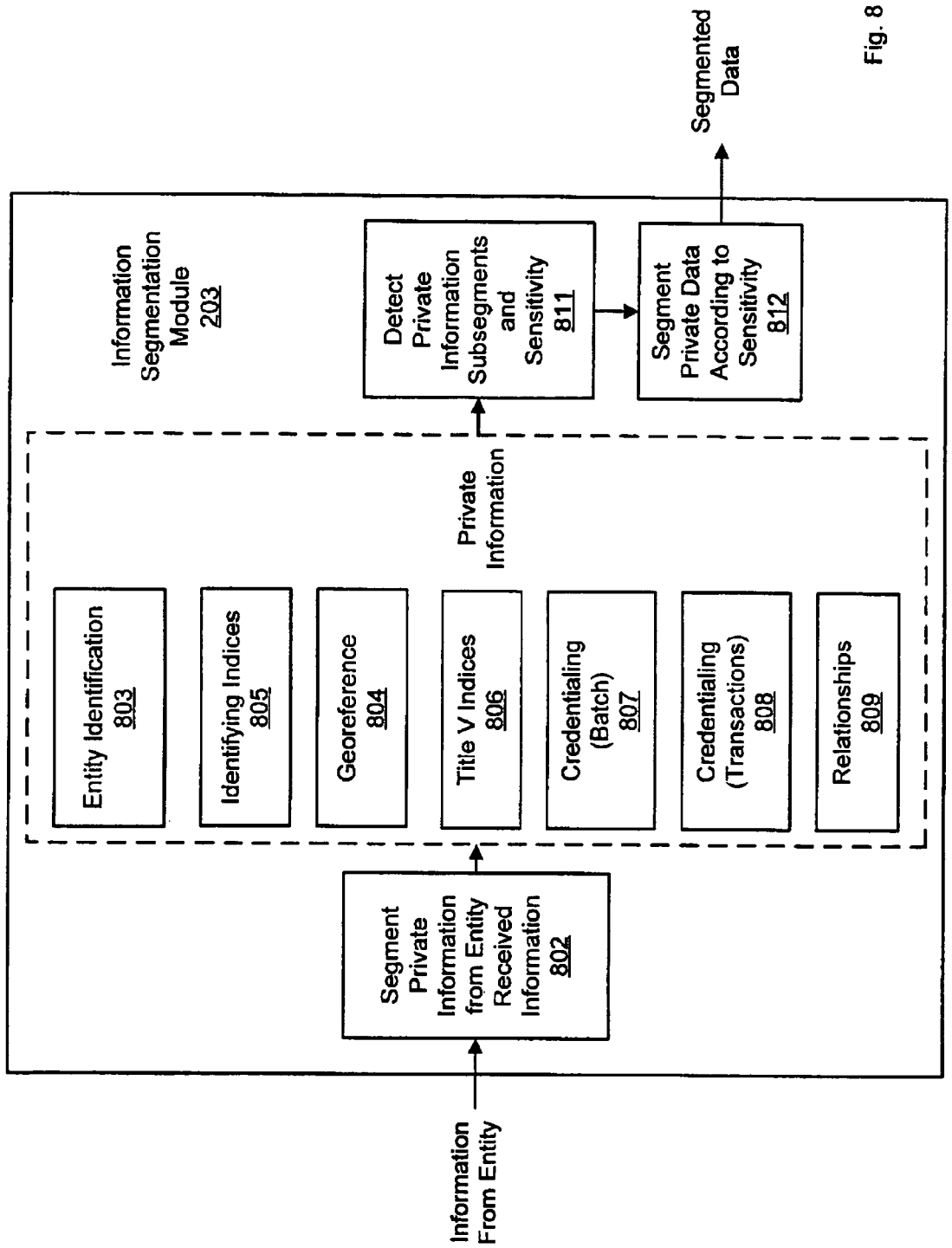
FIG. 8 is a block diagram of an operation performed by an information segmentation module in accordance with one exemplary embodiment of the present invention.

FIG. 8 is a block diagram of an operation performed by information segmentation module 203 of FIG. 2 in accordance with one exemplary embodiment of the present invention. In this embodiment, information segmentation module 203 receives information from an entity. Information segmentation module 203 then detects private information within the received information to subsequently segment the private information and tag it accordingly, in element 802. Information segmentation module 203 may then identify subsegments of the private information as well as the sensitivity of those subsegments, in element 811.

As shown herein, the private information is a segmented into the following subsegments: entity identification 803; georeference 804; identifying indices 805; Title V indices 806; batch credentialing 807; transaction credentialing 808; and relationships 809. These subsegments comprise private information illustrated in an order of increasing sensitivity. For example, the least sensitive information, entity identification 803, may include a person's name and/or any aliases associated with that person. Similarly entity identification 803 may indicate an organization's identity. The most sensitive information, relationships 809, may include information pertaining to a person's association with a particular organization.

The other subsegments are described as follows:
1. Georeference 804 may comprise information regarding a person's address (e.g. country, ZIP code, state, city and street) and phone numbers (country code, area code, prefix and/or any wireless indicators).
2. Identifying indices 805 may comprise information regarding a person's social security number, drivers license number, passport number, Visa number, credit account numbers, financial account numbers, professional affiliations, student identification numbers, etc.
3. Title V indices may comprise information regarding a person citizenship, date of birth, age, sex, race and/or marital status.
4. Batch credentialing 807 may comprise information regarding a person's credit, real estate, personal property, employment status, legal status (e.g., civil judgments and court convictions) and/or a medical status.
5. Transaction credentialing 808 may comprise information regarding a person's Visa application, student enrollment, country entry/exit tracking, shipping transactions and/or financial transactions.

Once the private information a segmented into these exemplary subsegments with each subsegment being identified with a particular private information sensitivity, the segmented data may be organized according to the sensitivity of the data in element 812. The segmented data may then be transferred to another entity according to a rule that designates which of the segments may be transferred to the other entity according to sensitivity. Additionally, information may be stored within the shared information system, such as shared information system 100 of FIG. 1, according to subsegment sensitivity.

Figure 9:
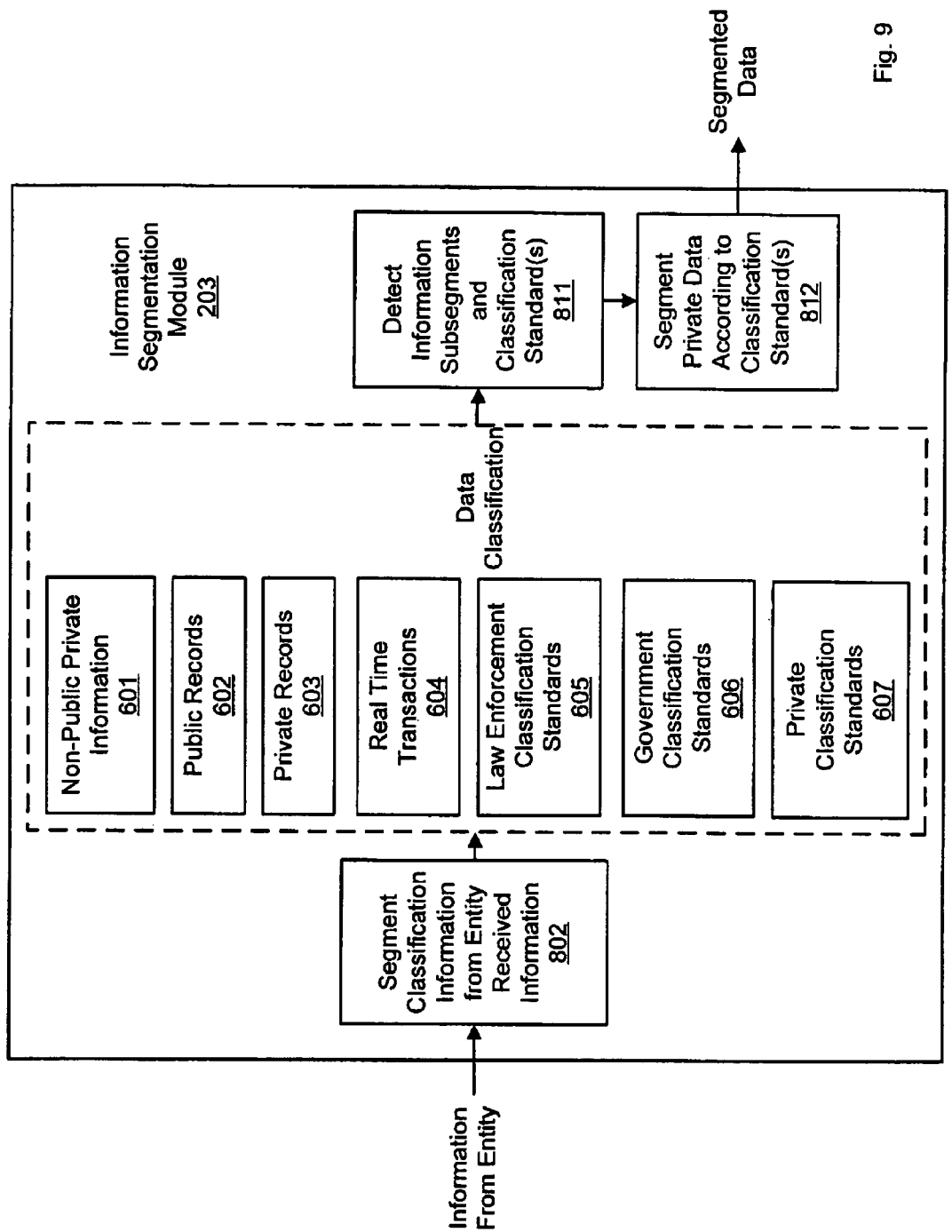
FIG. 9 is a block diagram of another operation performed by an information segmentation module in accordance with one exemplary embodiment of the present invention.

FIG. 9 is a block diagram of another operation performed by information segmentation module 203 in accordance with one exemplary embodiment of the present invention. In this embodiment, information segmentation module 203 again receives information from an entity. Information segmentation module 203 then detects a classification standard within the received information to subsequently segment the information and tag it accordingly, in element 802. Information segmentation module 203 may then identify subsegments of the information in a manner similar to that described in FIG. 8, in element 811. For example, information segmentation module 203 may identify subsegments of the information that include one or more of nonpublic private information 601, public records 602, private records 603, real-time transactions 604, law-enforcement classification standards 605, government classification standards 606 and private classification standards 607, as described in FIG. 6.

Once these subsegments are identified, information segmentation module 203 may segment the data according to the classification standard(s) of the data, in element 812. The data may thereby be organized by classification standard such that a rule may be generated to preclude the compromise of classified data to an unauthorized entity. For example, a private entity may not be entitled to receive information with a government security classification. Since the data may be segmented according to security classification, a rule may be generated that governs the transfer of information with respect to the classification standard and prevents the transfer of classified data to unauthorized entities.

Figure 10:
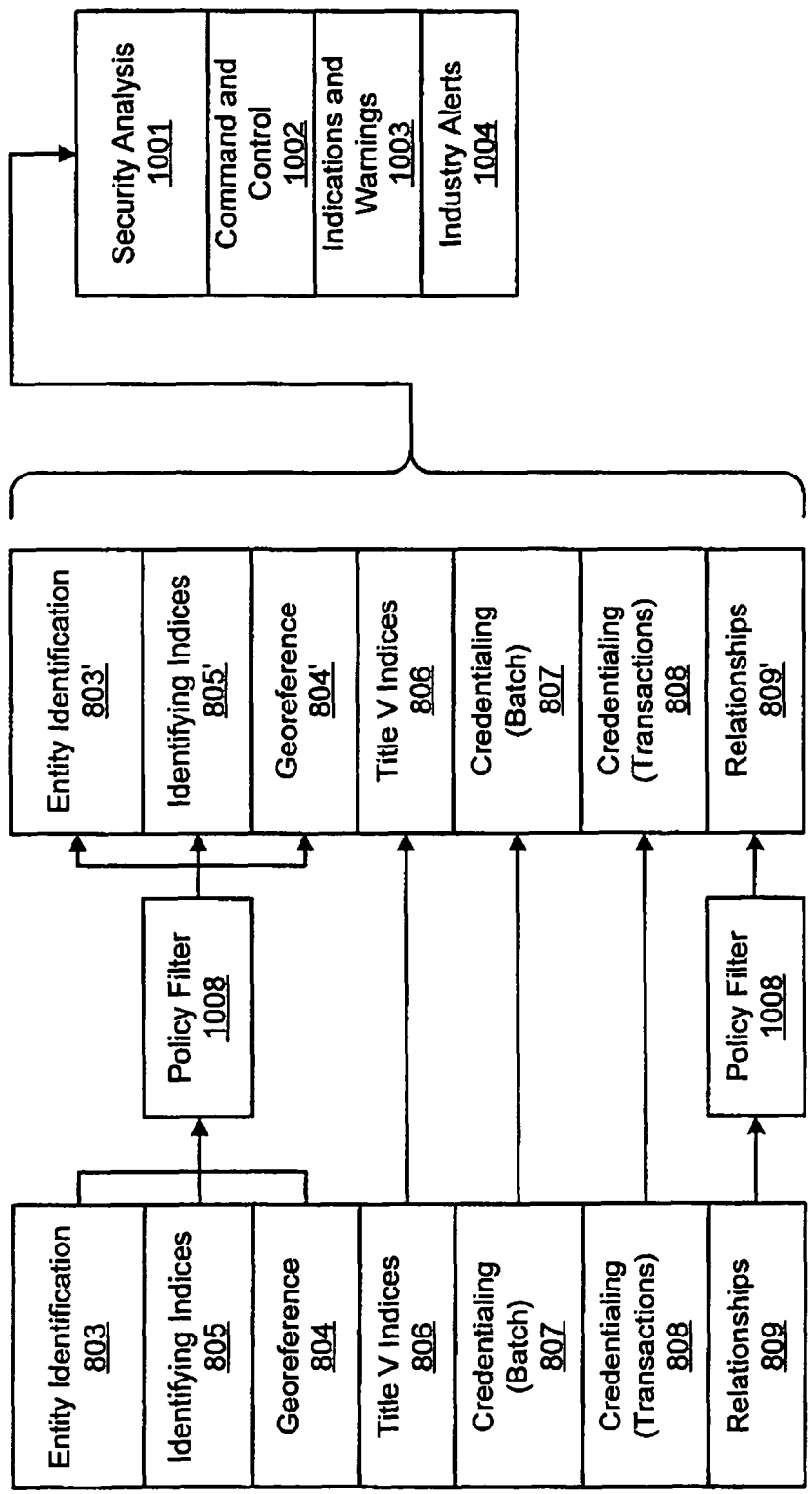
FIG. 10 is a block diagram of a data aggregation operation performed by an information segmentation module in accordance with one exemplary embodiment of the present invention.

FIG. 10 is a block diagram of a data aggregation operation performed by an information segmentation module, such as information segmentation module 203 of FIG. 2, in accordance with one exemplary embodiment of the present invention. In this embodiment, portions of the private information shown and described in elements 803-809 of FIG. 8 are sanitized and aggregated. For example, entity identification, identifying indices and georeference information of elements 803, 804 and 805 pass through a policy filter 1008 which thereby sanitizes the information to remove a person's name, numerical indicator (e.g., social security number), street address and phone number information. Similarly, information pertaining to relationships of element 809 passes through a policy filter 1008 to remove information pertaining to, for example, a person's association with a particular organization. The policy filters 1008 may be representative of rule processing such as described that above herein.

Once these portions of data are sanitized, they may be aggregated (i.e., grouped together) with similar data from other people. This aggregation of information may, however, create a certain level of sensitivity for the information. For example, while no piece of information alone may be particularly sensitive, the aggregation of this data may elevate the sensitivity of the data. Additionally, this aggregation may reveal information that is statistically significant and useful by other entities. Accordingly, information may be transferred for data analysis. This data analysis may include a security analysis 1001, command and control 1002, indications and warnings 1003, and industry alerts 1004.

Security analysis 1001 may initially analyze the statistically significant data to determine if information within the data poses any potential threat. If the data poses a threat, information is transferred to command and control 1002 for a determination as to a proceeding in light of such information. The command and control 1002 may flag the information with indications and warnings 1003 and subsequently issue an industry alert 1004 to inform entities of, for example, potential security risks, from which this data was derived.

Figure 11:
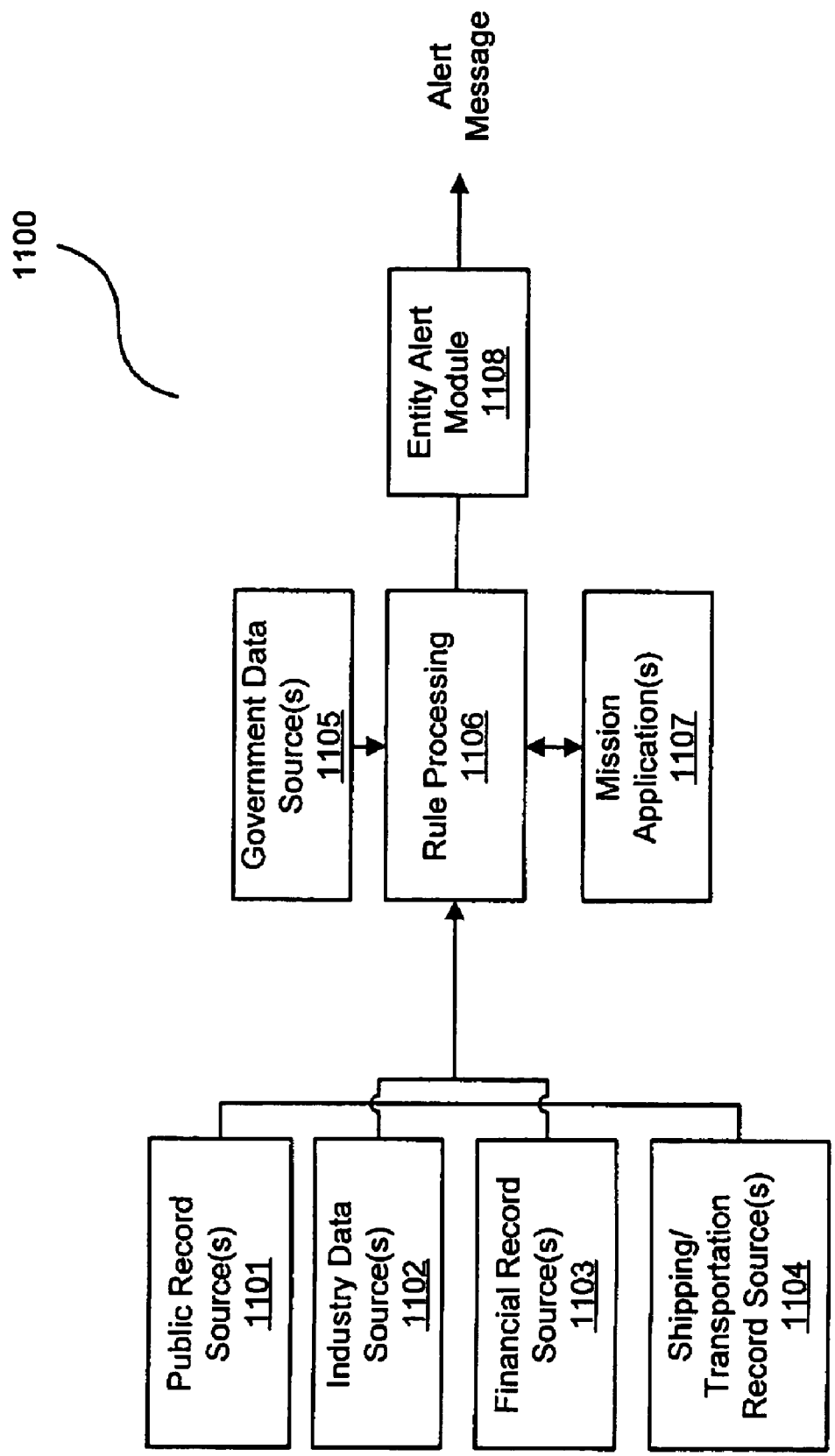
FIG. 11 is a block diagram of an operation of a shared information system in accordance with one exemplary embodiment of the present invention.

FIG. 11 is a block diagram of an operation of a shared information system, such as shared information system 100 of FIG. 1, in accordance with one exemplary embodiment of the present invention. The shared information system may receive information from a plurality of entities and sources. Examples of these entities and sources include public record sources 1101, industry data sources 1102, financial record sources 1103 and shipping/transportation record sources 1104. Each of these entities and sources may contribute to a "pool" of data that is available to the entities themselves as well as other entities, such as government entities. Additionally, government data sources 1105 may contribute to the pool of data.

Rule processing 1106 may operate in a fashion similar to the rule processing described hereinabove. For example, the pool of data collected from each of the entities and/or sources may be processed and transferred to requesting entities based on a need, a security authorization, and/or a use for the data. The rules may therefore govern the transfer of data to ensure that the integrity of the data is maintained and that no unauthorized access or use of the data occurs.

As shown and described in FIG. 10, processed data may be aggregated to produce certain statistical results. For example, information pertaining to a person of interest may be collected from passenger manifests of the airline industry to make certain inferences regarding that person. If the person continually travels to a location on a government watch list, an indicator regarding the person's travel habits may be generated. Coupled with other indicators, such as relationships to organizations on the government watch list, the shared information system may make an inference regarding the person's intentions.

This inference may be further processed by entity alert module 1108. The entity alert module may subsequently alert the various entities in communication with the shared information system. For example, if the person of interest has been deemed a terrorist by entity alert module 1108, the module will issue an alert message to the entities having dealings with that person such that they may alter their operations accordingly.

Additionally, certain mission applications 1107 may require access to the pooled data. A government entity may require certain information to fulfill a particular mission. The requesting government entity may access the data in either raw or processed formats to ascertain how the information may be useful to the government entity's mission. For example, once a person of interest has been deemed a terrorist by the shared information system, the requesting government entity may wish to locate the person and ascertain that person's intentions.

Although broadly shown and described, those skilled in the art should really recognize that the invention is not intended to be limited to the embodiment shown and described herein. For example, certain aspects of the shared information systems operations may be particularly useful with government entities. However, the shared information systems operations may also find particularly beneficial use within purely private entities, such as when a person of interest is deemed a computer hacker. The private entities may have computer systems that are vulnerable to computer attacks by a person of interest. Accordingly, the shared information system may issue an alert to reciprocating entities when the person of interest's modus operandi has been determined. The entities may subsequently alter their computer operations to prevent future attacks from this person.

Figure 12:
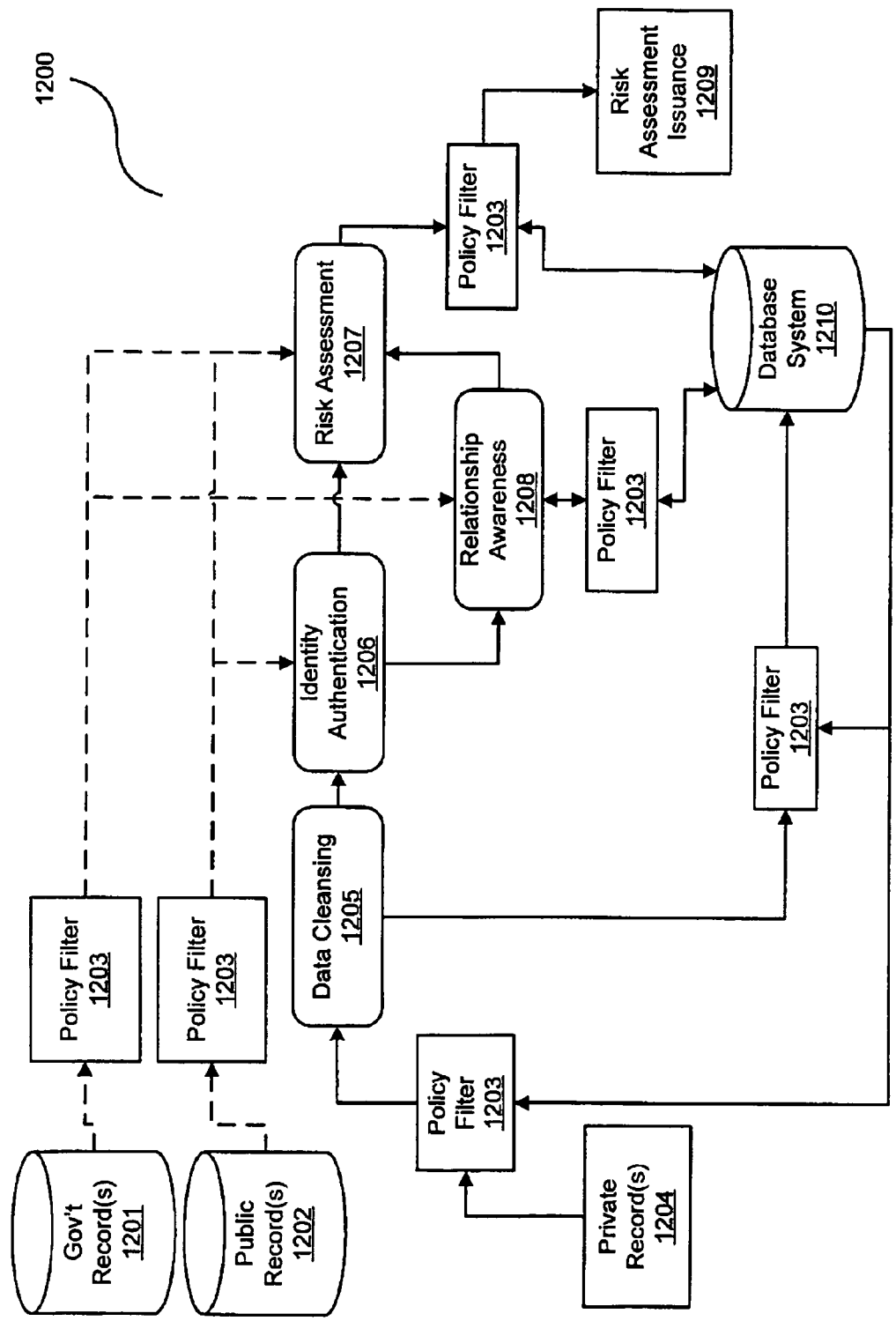
FIG. 12 is a detailed block diagram of a shared information system in accordance with one exemplary embodiment of the present invention.

FIG. 12 is a block diagram of shared information system 1200 in accordance with one exemplary embodiment of the present invention. Shared information system 1200 illustrates in this embodiment how the system receives information from government records 1201, public records 1202 and/or private records (e.g., commercial transactions, financial transactions and/or personal information) 1204. Each of the sources of information passes through a policy filter 1203. Each policy filter 1203 performs, in essence, the rule processing shown and described hereinabove. However, each policy filter 1203 may operate on the data according to rules generated specifically for the type of data being transferred. To illustrate, data from government records 1201 may have rules configured for specifically operating on government data to, for example, determine the classification of the data to be transferred and/or whom the data may be transferred. Policy filters 1203 operating on private records 1204 and public records 1202 may operate in a similar fashion.

In this embodiment, private records 1204 after passing through policy filter 1203 may experience data cleansing 1205. This data cleansing may remove certain segments of the data to prevent transfer of the segments to other entities. For example, a commercial entity may wish to transfer data regarding a person the entity has dealings with. The commercial entity may, however, wish to conceal that person's credit transactions with the entity. Data cleansing 1205 may delete the credit transaction data segments for that person and allow other information regarding that person to pass through.

Upon data cleansing 1205, a person's identity may be authenticated via identity authentication element 1206. Similarly, public records data 1202 of a person may be transferred to identity authentication element 1206. The identity authentication element 1206 processes data segments regarding a person of interest. For example, once the public records 1202 and private records 1204 have been transferred to identity authentication 1206 (i.e., without certain selected information), identity authentication 1206 correlates data segments from each of the sources to determine a more complete profile of that person. Identity authentication element 1206 is part of a security feature of system 1200 that also includes risk assessment element 1207 and relationship awareness element 1208.

The profile information of a person as generated by identity authentication element 1206 may be transferred to risk assessment element 1207 and/or relationship awareness element 1208. The profile generated by identity authentication element 1206 may be correlated with government record information to rapidly determine a risk assessment for a person of interest. However, if the profile information does not contain enough information to perform a risk assessment, the profile information may be correlated with government records and relationship data segments (i.e., such as those described hereinabove) in relationship awareness element 1208. The resulting profile information may then be forwarded to risk assessment element 1207 for a better estimate of a potential risk for a person of interest.

Risk assessment element 1207 scans and analyzes the data received from identity authentication element 1206, relationship awareness element 1208 and/or government records 1201. Risk assessment element 1209 may generate a risk assessment for the person of interest based on the received data. An alert message may be subsequently generated and forwarded to other entities subscribing to system 1200 should the profile information yield a potential risk. For example, once risk assessment element 1207 determines a person of interest is a terrorist, an alert message may be generated that contains information pertaining to that person and transferred to other cooperating entities, such as local law enforcement, airline organizations, banking organizations, et cetera. Prior to transferring the alert message, however, the message may undergo a policy filtering to remove certain data segments pertaining to, for example, a government agency's identity, data classification, et cetera.

The relationship awareness profile information (i.e., generated by relationship awareness element 1208) may be processed by another policy filter 1203. The risk assessment information as generated by risk assessment element 1207 may undergo a similar policy filtering. The policy filtering performed subsequently to relationship awareness element 1208 and risk assessment element 1207 may exclude certain data segments regarding the risk assessment and profile information of a person of interest. For example, relationship awareness element 1208 and risk assessment element 1207 may include information from certain government entities. Those government entities may wish to provide information to private organizations in the spirit of cooperation; however, those entities may wish to conceal their identities for security reasons. Accordingly, policy filter 1203 as communicatively coupled to relationship awareness element 1208 and risk assessment element 1207 may exclude information regarding the identities of those government entities.

Data segments of the relationship awareness element 1208 and risk assessment element 1207, as subsequently processed by policy filter 1203, may be optionally stored within database system 1210. For example, database system 1210 may store the data segments according to operational identifiers as described hereinabove. Alternatively database system 1210 may be configured as a real-time temporary storage system in which a processor operates on data segments according to the principles embodied hereinabove. The stored information may then be used by other entities, subject to additional policy filtering (i.e., via policy filter 1203).

The features and various embodiments of the invention described hereinabove may be implemented in a variety of manners. For example, the shared database system and its various components may be implemented in hardware, software, firmware and various combinations thereof. In one exemplary preferred embodiment, the invention may be implemented on or in conjunction with a computer server system employ a plurality of software components that operate to transfer data between entities in accordance with the principles described and illustrated herein. As such, the computer server system may operate a database system that stores information, at least temporarily, from one entity. The computer server system may then process that information according to a set of entity specific rules and subsequently transfer the processed information to one or more entities. Those skilled in the art are familiar with hardware, software, firmware and their various combinations.

While various embodiments of the present invention had been described in detail, further modifications and adaptations of the invention may occur to those skilled in the art. However, it is to be expressly understood that such modifications and adaptations are within the spirit and scope of the present invention. Accordingly, the invention is not intended to be limited to those embodiments disclosed herein. Rather, invention should only be limited to the language recited in the claims and their equivalents.

What is claimed is:

1. A system for sharing data, comprising:
a storage element configured for storing a plurality of rules, wherein the rules include rule information regarding a policy framework, a data type, a data transfer and a data classification; and
a processor including an information segmentation module configured for processing at least one of the plurality of rules, wherein said processor is responsive to a processed said at least one rule to control transfer of the data to a first entity and to maintain integrity of the data within the system based on the rule information, said information segmentation module being operative to segment the data into data segments and tag the data segments with sub component identifiers in accordance with policy information of the policy framework, wherein the policy information is selected from a group consisting of: a data owner; a data provider; a data user; and a data use;
wherein said information segmentation module is further operative to detect private information in the data, segment the private information into a plurality of subsegments with each subsegment being identified with a particular private information sensitivity, and organize the data according to the private information sensitivity whereby the segmented data may be transferred to the first entity according to a rule designating which of the segments may be transferred to the first entity according to the private information sensitivity;
wherein said information segmentation module is further operative to detect one or more classification standards within the data, segment the data according to the one or more classification standards, and organize the data by the one or more classification standards whereby a rule may be generated that governs the transfer of information with respect to the one or more classification standards and prevents the transfer of classified data to an unauthorized entity; and
wherein said information segmentation module is further operative to sanitize and aggregate portions of the private information.

2. The system of claim 1, wherein the policy information includes policy rules defined by the data owner, data provider or the data to provide a framework for implementing policy formulated by entities sharing the data.

3. The system of claim 1, wherein the data type includes entity information selected from a group consisting of: an individual's information; a company's information; a government organization's information; a name; an address; an account; an affiliation; and a relationship.

4. The system of claim 1, wherein the data type includes transactional information between entities, wherein the transactional information is selected from a group consisting of: purchases; shipments; travel; attendance; and contacts.

5. The system of claim 1, wherein the data classification is selected from a group consisting of: a public record; a private record; a government security classification; a law enforcement classification and a sensitivity classification.

6. The system of claim 1, wherein the data transfer includes transfer information selected from a group consisting of: a routing indicator; message field indicator; and a time stamp.

7. The system of claim 1, further comprising a communication portal communicatively coupled to the processor, wherein the communication portal is configured for allowing a second entity to transfer data between the second entity and the system.

8. The system of claim 1, further comprising a communication portal communicatively coupled to the processor, wherein the communication portal is configured for allowing the first entity to retrieve the data from the system.

9. The system of claim 1, further comprising a compliance auditor to review transferred data to ensure policy compliance.

10. The system of claim 9, wherein the compliance auditor is further configured for providing confirmation to a transferring entity in response to a requesting entity being granted access to the data.

11. A method of sharing stored data, comprising:
tagging data from a plurality of entities with one or more operational identifiers;
operating a processor to execute an information segmentation module within said processor, wherein the information segmentation module segments the data based on one or more of the operational identifiers, wherein the information segmentation module further detects private information in the data, segments the private information into a plurality of subsegments with each subsegment being identified with a particular private information sensitivity, and organizes the data according to the private information sensitivity whereby the segmented data may be transferred to an entity according to a rule designating which of the segments may be transferred to an entity according to the private information sensitivity, and wherein the information segmentation module further detects one or more classification standards within the data, segments the data according to the one or more classification standards, and organizes the data by the one or more classification standards whereby a rule may be generated that governs the transfer of information with respect to the one or more classification standards and prevents the transfer of classified data to an unauthorized entity;
storing segmented said data on a storage element in operative communication with said processor;
processing said stored segmented said data with said processor according to at least one rule, wherein a processed said at least one rule configures said processor to exclude from a first entity of said plurality of entities a one or more data segments of said stored segmented said data from a second entity of said plurality of entities;
aggregating a plurality of data segments of said stored segmented said data according to one or more of the operational identifiers, wherein the operational identifiers are selected from a group consisting of: a policy framework, a data type, a data transfer, and a data classification; and
recognizing a pattern within aggregated said plurality of data segments of said stored segmented said data to generate a message and to transfer the message to one or more of the plurality of entities according to an entity specific concern.

12. The method of claim 11, wherein the policy framework comprises operational identifier subsegments selected from a group consisting of: a data owner; a data provider, a data user; and a data use.

13. The method of claim 11, wherein the data type comprises operational identifier subsegments selected from a group consisting of: an individual's information subsegment; a company's information subsegment; a government organization's information subsegment; a name subsegment; an address subsegment; an account subsegment; an affiliation subsegment; and a relationship subsegment.

14. The method of claim 13, wherein the data type includes transactional information between entities, wherein the transactional information is selected from a group consisting of: purchases; shipments; travel; attendance; and contacts.

15. The method of claim 11, wherein the data classification comprises operational identifier subsegments selected from a group consisting of: a public record; a private record; a government security classification; a law enforcement classification; and a sensitivity classification.

16. The method of claim 11, wherein the data transfer comprises operational identifier subsegments selected from a group consisting of: a routing indicator; message field indicator; and a time stamp.

17. The method of claim 11, further comprising transferring at least a portion of aggregated said stored data to the first entity in response to processing.

18. A method of sharing data and protecting sensitive information within the data, comprising:
   storing data of a plurality of entities on a storage element in operative communication with a processor;
   storing a plurality of rules on the storage element, wherein the rules include rule information regarding a policy framework, a data type, a data transfer and a data classification;
   operating a processor to execute an information segmentation module within said processor, wherein the information segmentation module is configured for processing at least one of the plurality of rules, wherein said processor is responsive to a processed said at least one rule to control transfer of the data to a first entity and to maintain integrity of the data within the system based on the rule information;
   wherein said information segmentation module segments the data into data segments and tags the data segments with sub component identifiers in accordance with policy information of the policy framework, wherein the policy information is selected from a group consisting of: a data owner; a data provider; a data user; and a data use;
   wherein the information segmentation module detects private information in the data, segments the private information into a plurality of subsegments with each subsegment being identified with a particular private information sensitivity, and organizes the data according to the private information sensitivity whereby the segmented data may be transferred to an entity according to a rule designating which of the segments may be transferred to an entity according to the private information sensitivity; and
   wherein the information segmentation module further detects one or more classification standards within the data, segments the data according to the one or more classification standards, and organizes the data by the one or more classification standards whereby a rule may be generated that governs the transfer of information with respect to the one or more classification standards and prevents the transfer of classified data to an unauthorized entity;
   processing said plurality of rules with said processor, wherein at least one rule is associated with a first entity of said plurality of entities and wherein a processed said at least one rule is configurable to exclude from the first entity one or more segments of data of a second entity of said plurality of entities; and
   allowing the first entity to retrieve stored data with the one or more segments of data from the second entity excluded.

19. The system of claim 1 wherein the subsegments of private information are selected from a group consisting of: an entity identification subsegment, a georeference subsegment, an identifying indices subsegment, a Title V indices subsegment, a batch credentialing subsegment, a transaction credentialing subsegment, and a relationships subsegment.

20. The method of claim 11 wherein the subsegments of private information are selected from a group consisting of: an entity identification subsegment, a georeference subsegment, an identifying indices subsegment, a Title V indices subsegment, a batch credentialing subsegment, a transaction credentialing subsegment, and a relationships subsegment.

21. The method of claim 18 wherein the subsegments of private information are selected from a group consisting of: an entity identification subsegment, a georeference subsegment, an identifying indices subsegment, a Title V indices subsegment, a batch credentialing subsegment, a transaction credentialing subsegment, and a relationships subsegment.

* * * * *